Oct. 13, 1970  D. J. HENDERSON  3,533,539
MACHINE FOR MAKING DECORATIVE BOWS
Filed Dec. 28, 1960  6 Sheets-Sheet 1
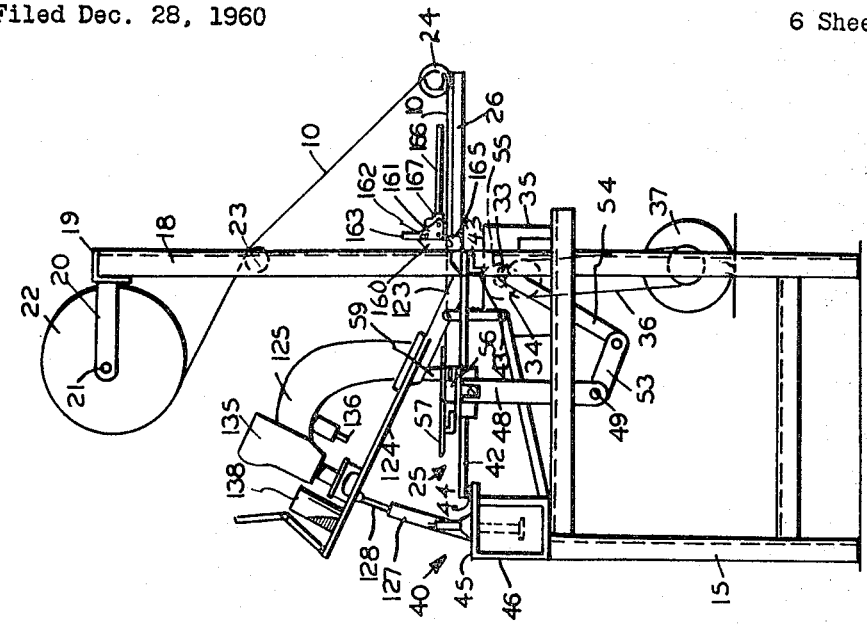
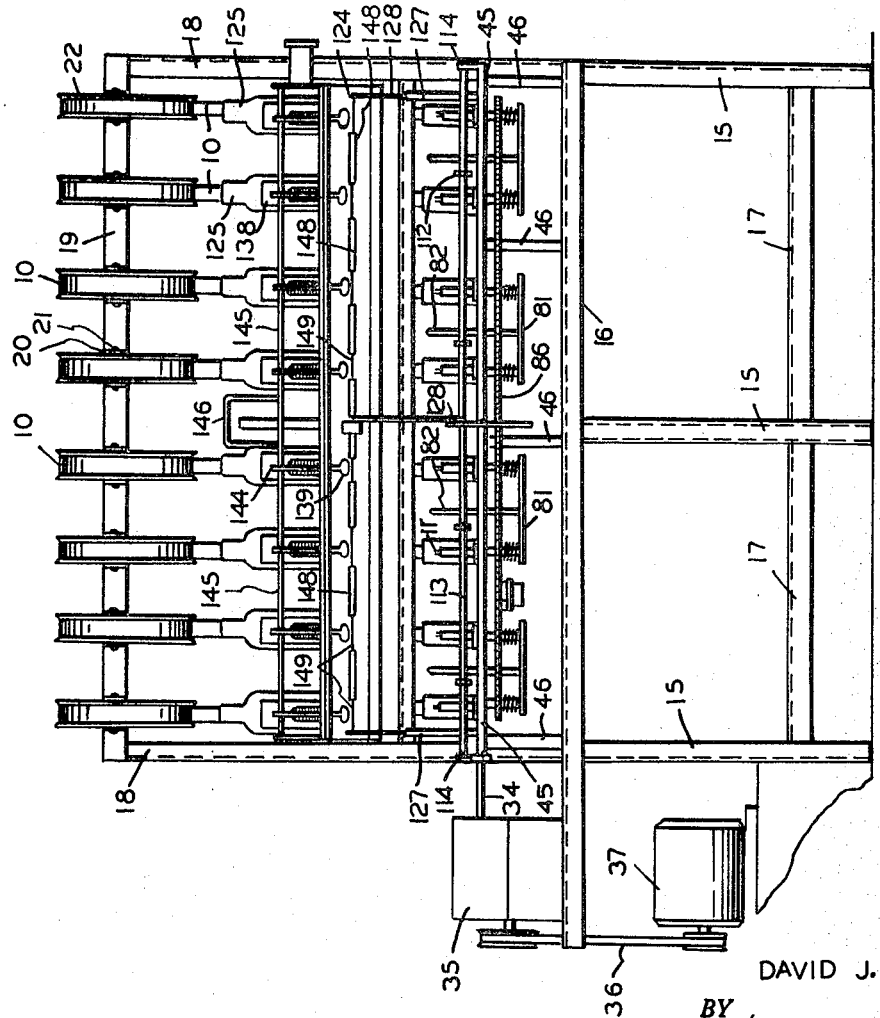
INVENTOR.
DAVID J. HENDERSON
BY
Corey, Hunt & Stemple
ATTORNEY Oct. 13, 1970    D. J. HENDERSON    3,533,539
MACHINE FOR MAKING DECORATIVE BOWS
Filed Dec. 28, 1960    6 Sheets-Sheet 2

*INVENTOR.*
DAVID J. HENDERSON
BY
ATTORNEYS

Oct. 13, 1970                    D. J. HENDERSON                    3,533,539
                        MACHINE FOR MAKING DECORATIVE BOWS
Filed Dec. 28, 1960                                              6 Sheets-Sheet 3

INVENTOR.
DAVID J. HENDERSON
BY
ATTORNEYS

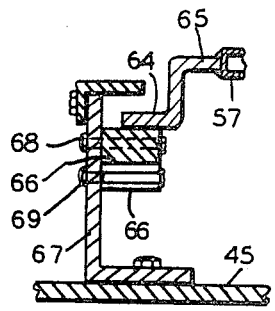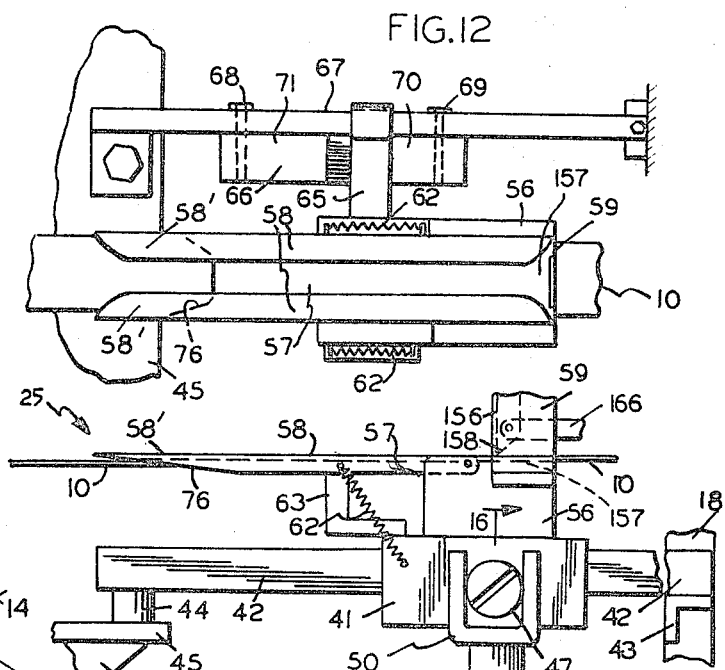

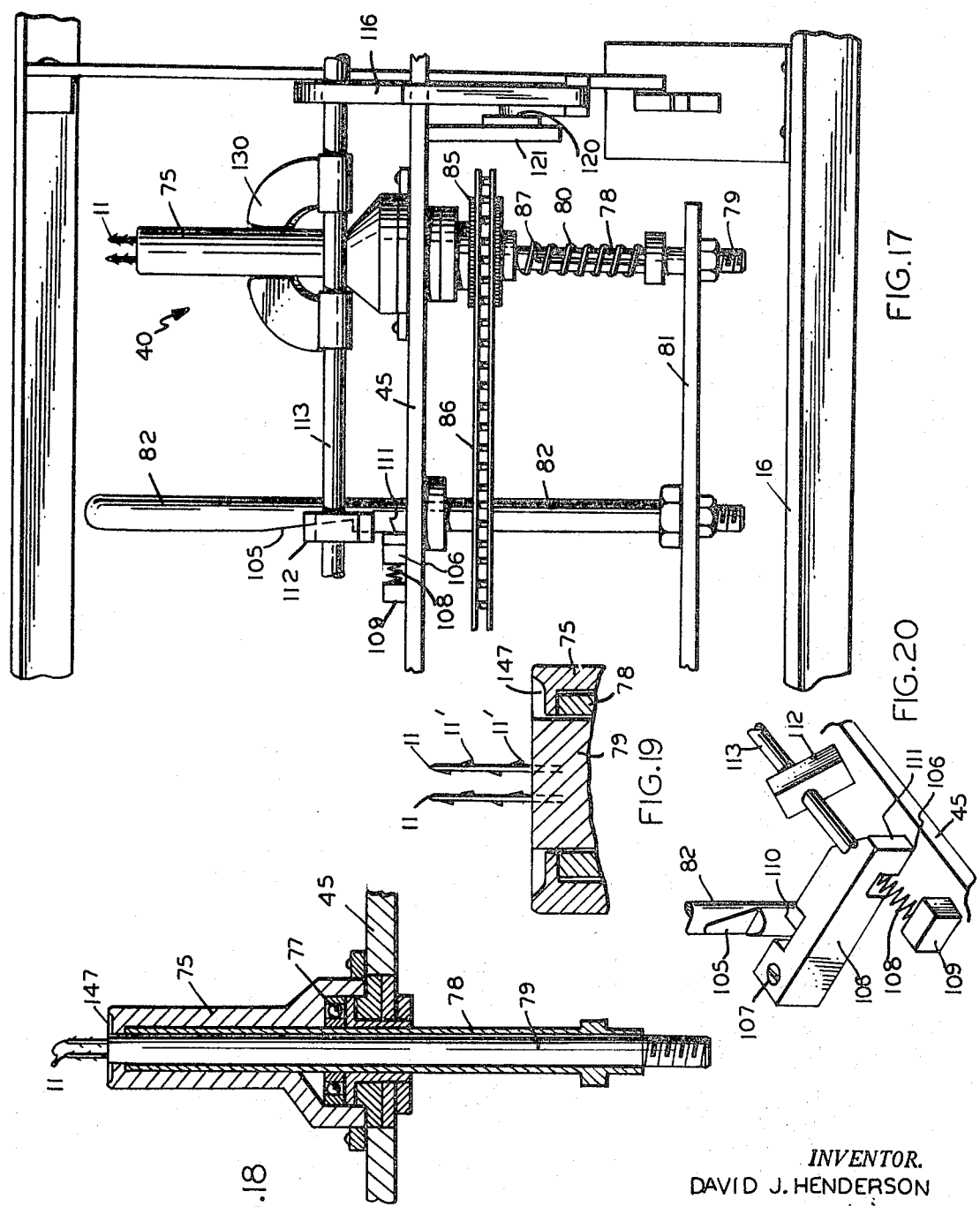

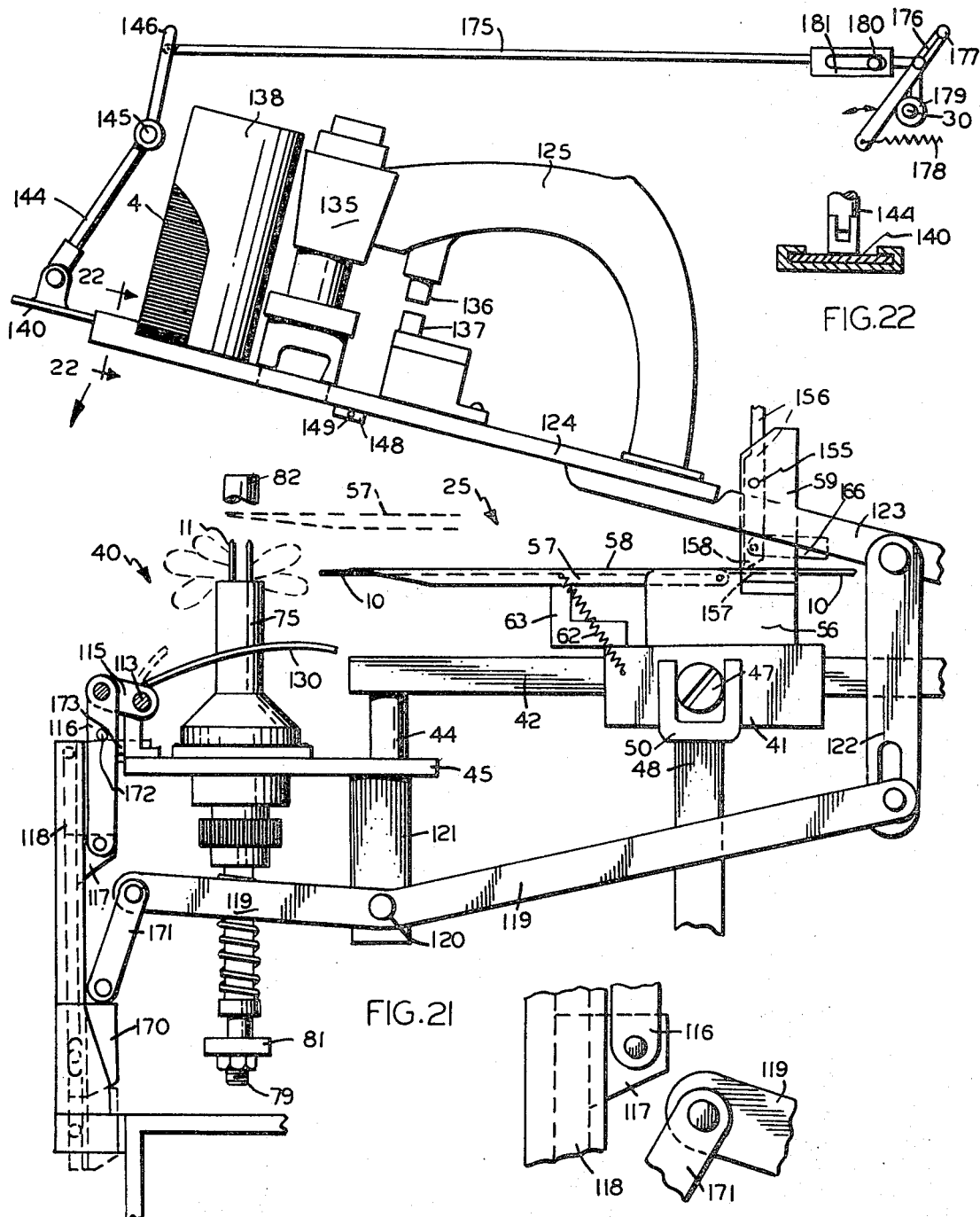

United States Patent Office 3,533,539
Patented Oct. 13, 1970

3,533,539
MACHINE FOR MAKING DECORATIVE BOWS
David J. Henderson, 270 Sheridan Drive,
Montreal West, Quebec, Canada
Filed Dec. 28, 1960, Ser. No. 78,900
Int. Cl. A41h *43/00*
U.S. Cl. 223—46              7 Claims The present invention relates to a machine for making ribbon bows suitable for use as ornamental decorations on packaged articles, window and table displays, and the like.

There was filed on Mar. 24, 1961, application Ser. No. 98,043 for Fabrication of Decorative Bows as a division of the instant application.

The machine of the invention is particularly adapted to the fabrications of bows composed of a continuous length of decorative ribbon that is formed into a succession of loops radiating from the bow center in the manner of the petals of a flower.

The principal object of the invention is to provide an improved machine for rapidly forming attractive decorative bows of the above indicated type.

Another object of the invention is to provide an improved machine capable of fabricating rapidly a succession of attractive decorative bows from a continuous length of strip material, such as a roll of decorative ribbon.

A further object of the invention is to provide an improved bow fabricating machine which combines a reciprocal motion with a loop twisting motion to form the bow loops successively from a continuous length of strip material, and which secures such bow loops at the bow center by a central holding means which is also usable as a means for attaching the finished bow to an article.

Other objects of the invention, as well as the advantages thereof will become apparent from a perusal of the following description, when read in connection with the accompanying drawings, in which FIG. 1 is a front elevational view of a machine embodying the features of the invention;

FIG. 2 is a side elevational view of the machine shown in FIG. 1;

FIG. 11 is a side elevational view of the mechanism for feeding the lengths of ribbon to make the bow loops;

FIG. 12 is a top plan view of the feeding mechanism;

FIG. 13 is a perspective view of a cam and cam follower associated with the feeding mechanism;

FIG. 14 is a vertical sectional view taken along the line 14—14 of FIG. 13;

FIG. 15 is a perspective view of the cam;

FIG. 16 is a partial cross-sectional view taken along the line 16—16 of FIG. 11;

FIG. 17 is an enlarged front elevational view of a needle assembly on which a bow is fabricated and associated components;

FIG. 18 is a vertical sectional view of a portion of the needle assembly;

FIG. 19 is an enlarged vertical sectional view of the top portion of the needle supporting bar;

FIG. 20 is a perspective view of clamping means associated with the needle assembly;

FIG. 21 is a side elevational view showing the relation of the ribbon feeding means, the needle assembly and the associated stapling mechanism;

FIG. 22 is a vertical sectional view taken along the line 22—22 of FIG. 21;

FIG. 23 is an enlarged view in side elevation of a detail in the mechanism shown in FIG. 21; and FIG. 24 is an enlarged view in side elevation showing the insertion of a staple through a cardboard disc that is to form part of a bow construction.

Figure 7:
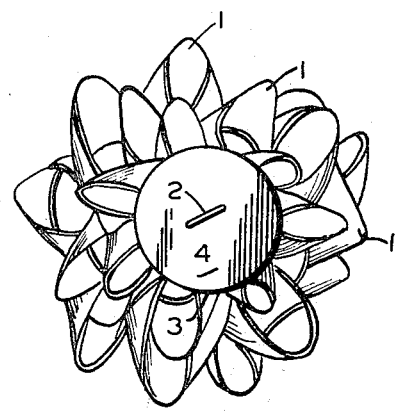
FIG. 7 is a bottom plan view of the bow shown in FIG. 6.
Figure 6:
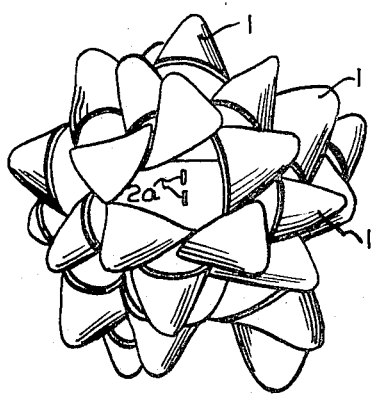
FIG. 6 is a top plan view of a finished bow with the loops spread from the center thereof to show how the legs of the loops are secured together.

Considering first the construction of a form of bow which may be made on the machine of this invention, reference is made to FIGS. 6 and 7 of the drawings, in the former of which the loops 1 of the bow are spread open from the center to show more clearly the manner in which such loops are secured together. The bow shown is made from a continuous length of strip material, such as decorative ribbon, which has been formed into a succession of loops 1 so that they radiate in a plurality of directions from a common central point or place. Each of the loops is composed of a pair of legs 1a, 1b in FIG. 4 and a curved central portion 1c integral with the legs. The legs of each loop intersect in face-to-back or face-to-face relation at the central point or place which is common to the places of intersection of the legs of the other loops. This method of intersecting the legs of the loops gives to the central portion 1c thereof a generally conoidal shape (note FIG. 6), especially when the bows are made of ribbon material having sufficient body, such as metallic foil. This formation of the loops tends to make them curl towards the center of the bow to present a solid area of loops which cover the place of intersection of the legs thereof.

At the place of intersection of the loop legs, the loops are secured together by a U-shaped staple 2 which is driven in through the back of the bow so that the legs thereof project forwardly of the bow. The spaced staple legs extend through the intersecting portions of the loop legs and fix them in their radial, relatively disposed positions. The ends 2a of the staple are bent towards each other to bind the loops together. As above indicated the loops of the bow will normally conceal the staple ends 2a in the form of bow illustrated. At the back of the bow the staple 2 passes through and secures to the bow a disc 3 made of suitable material, such as cardboard, or the like. The rear face of the disc 3 is preferably provided with a layer 4 of a suitable pressure sensitive adhesive by which the bow may be attached readily to a package surface or other support (compare FIGS. 7 and 24).

Figure 3:
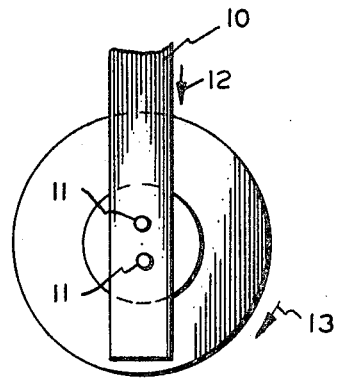
FIG. 3 is a top plan view showing an initial step in the fabrication of a bow on the machine.
Figure 4:
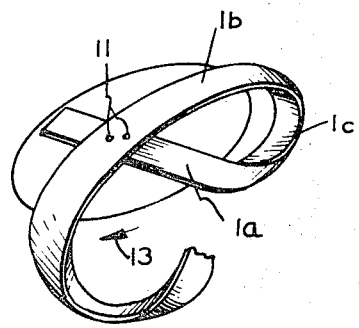
FIG. 4 is a perspective view showing how the first loop of the bow is formed.
Figure 5:
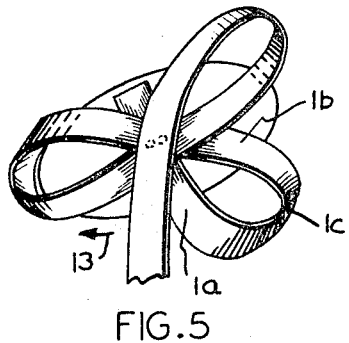
FIG. 5 is a view similar to FIG. 4 but showing the formation of successive loops of the bow.

The manner in which the bow of FIGS. 6 and 7 is formed by the machine herein is best shown in FIGS. 3 to 5 of the drawings. As indicated in FIG. 3, the ribbon, adjacent to its free end, is initially attached to two needles 11, 11 provided at the top of a needle bar 79 (note FIG. 18). In making such attachment the ribbon is fed forwardly in the direction of the arrow 12 to a position over the needles and then by a downward movement of the ribbon impaling the portion thereof to be attached onto the two vertically disposed needles. It will be noted that in this initial attachment of the ribbon, the two needles 11, 11 may be aligned with the direction of feed of the ribbon 10. A second portion of the ribbon located at a point spaced from the needles a distance equal to the length of the ribbon in the loop 1 to be formed is then advanced to a position over the needles. Prior to the arrival of such second ribbon portion over the needles, the needles are rotated in the direction of the arrow 13 to the position shown in FIG. 4, whereby the length of ribbon to form the loop is twisted lengthwise. Thus, when the second ribbon portion is impaled on the needles 11, 11, the first and second ribbon portions will be brought together in face-to-back relation with the legs of the loop intersecting at the angle through which the needles have been rotated. When this operation has been completed the ribbon will be in the condition shown in FIG. 4 of the drawings with one loop of the bow completed.

A third portion of the ribbon located at a point spaced from the needles 11, 11 a distance equal to the length of the ribbon in the next loop to be formed is then advanced over the needles and the latter are rotated in the manner above described before impaling such third ribbon portion on the needles to form the loop. The degree to which the needles 11, 11 are rotated in the formation of the loop is determinative of the radial disposition of the second loop relative to the loop initially formed and of course the radial disposition of all of the loops about the place of intersection. The two loops thus formed are shown arranged on the needles 11, 11 in FIG. 5 of the drawings. In a similar fashion successive loops are folded on the intermittently rotating needles 11, 11 until the number of loops desired to be contained on the complete bow has been formed. The loops are fixed in the relation in which they have been applied to the needles or pins and the disc 3 attached to the intersecting portions thereof by means of the staple 2.

In the machine of the invention, a plurality of bows are made simultaneously by a plurality of devices of like construction which form elements of the machine. As is shown in FIGS. 1 and 2 of the drawings, the frame of the machine on which such devices are mounted, is made of a plurality of angle beams and includes end and central leg units 15 secured together by front and rear top horizontal beams 16 and connecting beams 17, all of which form a table-like frame. Extending upwardly from the rear end of the table frame is a bracket-like frame comprising end uprights 18 and a top member 19.

Each of the bow making devices includes a U-shaped bracket 20 secured at its closed end to the top member 19 so as to project horizontally forwardly. There are as many brackets 20 as there are bow making devices and such brackets are secured in spaced horizontal relation along the length of the top member 19. The forward end of each bracket 20 is provided with a transverse pin 21 on which is rotatably mounted a supply roll 22 of ribbon 10. The ribbon 10 feeds from each roll 22 downwardly and rearwardly over a guide roll 23, and thence downwardly in back of and under a guide roll 24 revolvably mounted on a horizontal bar 26 and then forwardly toward a feeding station disposed over the table frame. The feeding station is indicated generally in FIG. 2 of the drawings by the reference numeral 25.

Provided at the feeding station 25 of each bow making device are means for feeding intermittently, successive lengths of the ribbon to the bow making station 40 at which such lengths are successively folded into loops of the bow being formed thereat in the manner previously described. As is shown more clearly in FIGS. 2 and 11 to 16 of the drawings, such feeding means include a carriage 41 slidably mounted on a horizontally disposed transverse guide bar 42 supported at its rear end by an angle beam 43 which extends between the end members 18 of the bracket frame and is supported thereby. The front end of bar 42 is mounted on a pin 44 provided on a horizontal plate 45 extending along the front of the machine and supported at spaced intervals by a plurality of vertical flanged plates 46 in FIGS. 1 and 2 mounted on the front horizontal beam 16. The carriage 41 is connected by screws 47 with the U-shaped ends of a yoke 50 provided on the upper end of an actuating arm 48 which is secured at its lower end to a longitudinally extending shaft 49 revolvably supported at its ends on the end frame units 15 (note FIG. 8). Rocking movement is imparted to shaft 49 by an arm 53 which is secured at one end to such shaft and which is connected at its other end to the lower end of a driving link 54. The upper end of link 54 is connected eccentrically to a cam disc 55 secured to a constantly rotating drive shaft 34 which is the main drive shaft of the machine. The shaft 34 is driven through a suitable gearbox construction 35 mounted on extensions of the horizontal beams 16. The gearbox 35 is connected in driven relation by means of a pulley arrangement 36 to a motor 37.

It will be understood from the foregoing that as cam disc 55 is constantly rotated by shaft 34, link 54 through its off center connection to disc 55 will oscillate arm 53 about the axis of shaft 49 thus causing the latter rock. The rocking movement of shaft 49 will cause arm 48 to reciprocate carriage 41 forwardly and rearwardly on the guide bar 42.

Mounted on the carriage 41 is a block 56 provided with two upstanding trunnions on which is pivotally supported a ribbon guide plate 57 adjacent to the rear end of the latter. As is shown more clearly in FIGS. 11 to 13, the guide plate 57 is constructed of an elongated strip of metal folded along its longitudinal edges to provide guide strips 58 which overlie the longitudinal edges of the ribbon 10 advancing over the body of the guide plate to control the ribbon but offering no obstruction to the feed thereof. The ribbon 10 is guided into the elongated slot formed between the body of the guide plate 57 and its folded longitudinal edge portions 58 by the vertically disposed, parallelly arranged standards 59 mounted on the block 56 adjacent to the rear end of such guide plate, the latter of which forms the entry end of the guide plate for the ribbon 10 feeding therethrough. Rotatably mounted on the standards 59 for pivotal movement about axis 155 is a finger 156 which extends downwardly from such axis between such standards into resting engagement on the portion of the ribbon extending over a plate portion 157 extending transversely of the standards 59 at the bases thereof. The finger 156 is so constructed that when the guide plate 57 is retracted in its reciprocating movements so that it moves rearwardly relative to the stationary tape which is fixed at its forward end to the pins 11, 11, the finger 156 will pivot readily about its axis 155 so that the rounded working nose 158 thereof will ride freely on the ribbon. It will be noted that the finger nose 158 is slightly offset vertically and in advance of the axis 155 so that when the guide plate is advanced, such nose has the tendency to immediately come into jamming relation with the plate portion 157 to lock the ribbon therebetween. Thus on advancing movement of the guide plate, the ribbon will be gripped between the finger nose 158 and plate portion 157 which advance as a unit with such guide plate, to advance the gripped portion of the ribbon with the guide plate. The stroke of the carriage 41 is such that the distance through which the plate 57 is advanced is equal to the length of ribbon needed to form one loop of the bow. The said length of ribbon is obtained from a portion thereof extending rearwardly of the finger 156 and between the latter and the guide roll 24 mounted on the rear end of the horizontal bar 26. The front end of the bar 26 is secured upon the rear end of guide bar 42 and to the angle beam 43 and such bar 26 extends rearwardly from such connection in substantial alignment with the guide bar 42 so that it is actually a rearward extension of the latter. Secured to bar 26 adjacent to its connected front end is a bracket member 160 to which is secured in any suitable manner, as by screws, a pair of spaced, right angled triangularly shaped plates 161, 161. The plates 161 are connected to bracket member 160 so that one right angular edge of each is vertically disposed and the other right angular edge of each is located horizontally at the bottom of the plate and extends rearwardly from the bracket member. Pivotally supported on the upper apexes of the plates 161 for movement about an axis 162 is a finger 163 having a tape engaging nose at its lower end. The finger 163 is connected by a horizontal rod 166 to finger 156 so that the movements of the former are synchronized with the latter. The rod 166 is slidably supported adjacent to the bracket member 160 by a guide block 167 mounted on the rear ends of the horizontal edges of the plates 161. It will thus be seen that as finger 156 is pivoted in the operations of the guide plate 57, the finger 163 will move similarly to ride freely over the tape when the guide plate is retracted, and to clamp the tape against a transverse plate 165 when the guide plate 57 is advanced. During such advancing movement of the guide plate 57, the clamped finger 163 and plate 165 will draw additional tape from the associated supply reel 22 and of a length equal to the stroke of the guide plate 57.

The guide plate 57 for the major portion of its range of movement in the formation of a ribbon loop is horizontally disposed as shown in FIGS. 11 and 21 of the drawings. This position of the guide plate is attained through the biasing action of a pair of springs 62 which are secured at one end to the carriage 41 and at their other ends to the guide plate at points in advance of the pivotal axis of such plate so that they tend to maintain the plate in contact with a stop 63 located under the guide plate. The stop 63 is provided on the forward end of a bracket arm mounted on the carriage 41 so that it moves with the latter, and is located in the region of attachment of the springs 62 to the guide plate.

The guide plate 57 is pivoted upwardly from the horizontal position during its advancing stroke to enable the forward or front end thereof to be brought to a position above the needles 11 at the end of such stroke in the manner indicated by the dotted lines in FIG. 21 of the drawings. This upward pivotal movement of the guide plate 57 is accomplished by means of a cam follower 65 and a cam member 66. The cam follower 65 is in the form of a bent bar which is disposed transversely to the guide plate and which is secured at one end to the latter at a point in advance of the pivotal axis of such guide plate. The other bent end 64 of the cam follower 65 is adapted to ride on the top surface of the cam member 66 which has an inclined rear end portion 70. The cam member 66 is supported in inclined relation on a bracket 67 secured at its front end to the horizontal plate 45 at the front of the machine and supported at its rear end by the bracket frame of the machine. The cam member 66 is pivotally connected to the bracket at its forward end by a bolt 68 and at its rear end rests on a pin 69 secured to bracket 67. Bolt 68 is located above the path of travel of the bent end 64 of cam follower 65 when the guide plate 57 is in horizontal position, while pin 69 is located below such path of travel. Thus, as the carriage 41 advances from a retracted position whereat the cam follower 65 is located to the rear of cam member 66, the bent end 64 of such follower will come into engagement with the inclined surface portion 70 of cam member 66 and ride up such surface to the forward end portion 71 of the top surface of the cam member, the latter of which is inclined less to the horizontal than surface portion 70. As the cam follower rides up said two top surface portions, the front end of the guide plate 57 is pivoted upwardly against the tension of the springs 62, at first quickly, and then more slowly, until such plate end is raised to a point above the tops of the needles 11. When the carriage 41 approaches the end of its forward stroke the forward end of the guide plate 57 will be poised above the needles 11, as is indicated by the dotted line position of the guide plate in FIG. 21 of the drawings, and the bent end 64 of the cam follower will have arrived at the forward end of the cam member 66.

As the carriage 41 completes its forward stroke the bent end 64 of the cam follower will move past the forward end of cam member 66 thus enabling the springs 62 to come into action to snap the guide plate 57 down against the stop 63. On the return stroke of the carriage 41, the bent end 64 of the cam follower will pass under the bolt 68 and again engage the cam member 66 behind such bolt to raise such member about the bolt as an axis. The bent end 64 will then pass over the pin 69 and when it has moved past the rear end of cam member 66, the later will drop onto the pin 69 to return the inclined surface portion 70 to a position across the path of travel of the bent end 64, in position to raise the latter on the next advancing stroke of the carriage 41.

It will be noted from FIG. 21 of the drawings, that in its horizontal position, the guide plate 57 is at the same level as the top of a housing 75 from which the needles 11 project. It will also be noted from FIGS. 11 and 12, that the body of the guide plate 57 at its forward end is beveled so that the terminal forward end of the body is eliminated, as indicated by the edge 76 in such figures. At the terminal forward end of the guide plate therefore, there are only the projecting terminal ends 58' of the plate portions 58 overlying the edges of the underlying portion of the ribbon 10. Thus when the guide plate 57 is snapped back to horizontal position by the springs 62 at the end of its forward stroke, the plate end portions 58' will impale the portion of the ribbon underlying the same on the needles 11 and push such ribbon portion down the needles as far as possible depending on the number of ribbon sections that have already been impaled on the needles, before withdrawing on the return stroke of the carriage 41. The two end portions 58' are spaced apart a distance at least equal to the transverse area occupied by the needles so that there is no interference between these parts during the securement of the ribbon portion.

It will be observed more clearly from FIG. 19 of the drawings, that each of the needles 11 is provided with a plurality of ridges or shoulders 11' that hold the impaled sections of ribbon on the needles and prevent them from rising up on and becoming disengaged from the needles under the inherent resiliency of the ribbon material when the guide plate 57 is withdrawn. The ridges 11' are quite small so as to provide small shoulder stops sufficient for the accomplishment of the aforesaid purpose, but not capable of offering substantial hindrance to the withdrawal of the needles from such ribbon sections in a subsequent operation of the machine.

The needle assembly associated with each bow making device includes the aforesaid housing 75 which is mounted on the plate 45 so as to be aligned with its associated guide bar 42. Located within the housing is a sleeve or liner 78 that is supported for free rotational movement about a vertical longitudinal axis coincident with the vertical axis of the housing by a ball bearing unit 77 contained in the enlarged base of housing 75. The liner 78 has slidably received therein a circular bar 79 on the upper end of which are mounted the needles 11. The bar 79 is normally retained in raised condition by a spring 80 in FIG. 17 which is connected at one end to such bar and at its other end to the liner 78. The bar 79 may be pulled down against the tension of spring 80 by depressing a horizontal bar 81 connected to the lower end of needle bar 79 in any suitable manner as by the nut connection shown in FIGS. 17 and 21. As will be observed more clearly in FIG. 1 of the drawings, there are a plurality of aligned horizontal bars 81, each of which is associated with and supported at its ends by the vertical needle bars 79 of two adjacent bow making machines. In a manner which will hereinafter be more fully explained, each bar 81 is depressed through a vertical pin 82 which is supported upon and connected at its lower end to the bar at a point located between the two adjacent bow making machines.

Connected to the liner or sleeve 78 of each needle assembly, is a sprocket 85 which is engaged by a horizontally disposed drive chain 86. The rotational movement imparted to the sleeve 78 through chain 86 and sprocket 85 is transmitted to the associated needle bar 79 through a pin 87 provided on the latter and extending through an elongated vertical slot in the sleeve 78 (note FIG. 17). As a result of this construction rotational movement may be imparted to the needle bar 79 from the chain 86 and through sleeve 78 without interfering with any vertical sliding movements of bar 79 relative to sleeve 78. It will be observed from FIGS. 1 and 8, that the drive chain 86 is an endless chain that extends the entire length of the machine and is in driven engagement with the sprockets 85 of all of the bow making devices. The chain 86 is also in engagement with a sprocket 88, in FIG. 9, secured to a vertical shaft 89 rotatably supported at its upper and lower ends by the plate 45 and a bearing bracket 90, respectively. Also secured to shaft 89 is a ratchet 91 which is engaged by a pawl 92 pivotally mounted on a circular plate 93 rotatably mounted on shaft 89. Also rotatably mounted on shaft 89 and secured to the ratchet carrier plate 93 is a gear 94 that is engaged by a rack 95. The engagement of a gear 94 and rack 95 is maintained by a vertical portion of the bearing bracket 90.

Figure 10:
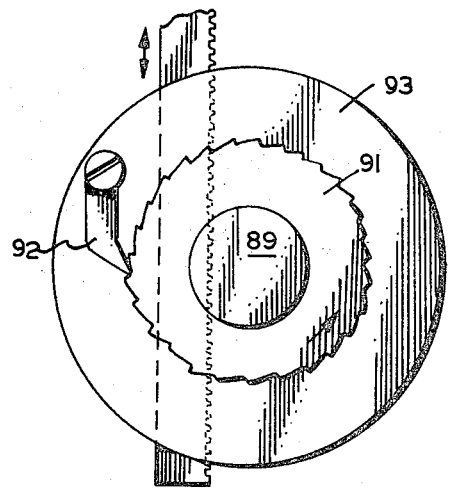
FIG. 10 is a top plan view of the ratchet assembly.

It will be understood from the foregoing, that as rack 95 is reciprocated it causes gear 94 and plate 93 to rotate in one direction or the other. When plate 93 is rotated counter-clockwise, as viewed in FIG. 10 of the drawings, pawl 92 drives ratchet 91 and cosnequently shaft 89 and sprocket 88 in the same direction. This rotational movement is transmitted through chain 86, sprockets 85, liners 78 and pins 87 to the needle bars 79 which are caused to rotate a like amount in the same direction. The rotational movement thus imparted to the needle bars 79 is intermittent and as has been previously indicated its amount is dependent upon the radial arrangement of the loops in the bows being constructed. Generally speaking, the amount of rotational movement imparted to each bar in the formation of each loop is equal to the number of degrees necessary to accomplish the desired twist in the ribbon portions extending from the guide plate 57 to the pins 11 of a bow making device necessary to enable the legs of the loop to be brought into the desired surface relation of the ribbon on the pins, plus the degree of twist necessary to provide the desired angular relation between the intersecting legs of the loop. This latter factor will depend upon how large the angle is to be between the intersecting legs of successive loops.

Figure 8:
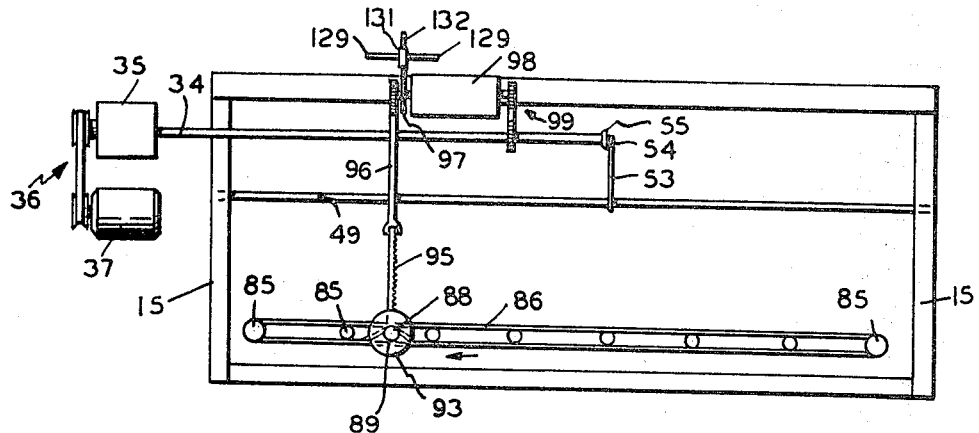
FIG. 8 is a schematic view showing the arrangement of the driving mechanism of the machine.
Figure 9:
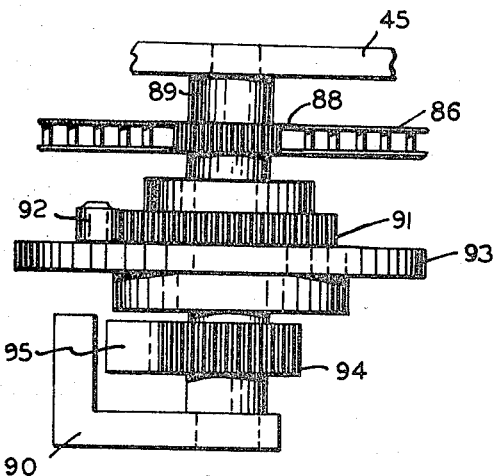
FIG. 9 is an enlarged detail view in front elevation of a ratchet assembly forming part of the driving mechanism shown in FIG. 8.

As is shown more clearly in FIG. 8 of the drawings, the rack 95 is pivotally connected at its rear end to the forward end of an actuating arm 96 which is connected at its rear end to an eccentric 97. The eccentric 97 is mounted on the driven shaft of a reducer 98 that is connected to main shaft 34 by a suitable gear and chain arrangement 99. Thus as the eccentric 97 is continuously rotated from the main shaft, it causes arm 96 and consequently rack 95 to reciprocate forwardly and rearwardly through a predetermined range of movement to impart the desired intermittent rotational movement to the needle bars 79 in the manner previously explained during the formation of the loops on the bow being formed on the needles 11. As has been indicated, the driving arrangement is such that a needle bar is caused to rotate through the desired angle following the completion of a ribbon loop thereon and the withdrawal of the guide bar 57 from the bow being fabricated so that the next length of ribbon to be formed into a loop will be twisted through the number of degrees necessary to establish the desired surface relation of the loop legs and the proper angle at which the next portion of the ribbon to be impaled will be disposed to the previously impaled portion thereof will be established before a loop is made of such next length of ribbon on the succeeding advancing stroke of the carriage 41. This degree of rotation of the needle bar may be varied to obtain bows of different loop construction by varying the connection of arm 96 and eccentric 97 and consequently the stroke of rack 95.

When the number of loops desired in the finished bow have been formed on the needles 11, the latter are retracted to enable a staple to be driven through the intersecting leg portions of the loops and an adhesive coated disc 4 which is placed upon the completed loops. It has been above indicated, that this is accomplished by the pin 82 depressing the bar 81 on which it is supported, to retract the needle bar 79 on which the needles are mounted. As is shown more clearly in FIG. 17 of the drawings, the pin 82 extends vertically through and is guided in its sliding movements by the horizontal plate 45. Adjacently above the plate 45 in the normal raised position of pin 82, the latter is provided with a notch 105 which is formed to interengage with a latch member 106 to retain the pin 82 in a retracted position until released. As shown in FIG. 20, the latch member 106 is mounted for pivotal movement on plate 45 about an axis 107 and is normally maintained pressed against the pin 82 through spring 108 and a spring retaining block 109 secured to plate 45. The latch member 106 is provided with a notch 110 in which the pin 82 is received and the inner end of which moves over the shoulder formed by the pin notch 105 when the pin 82 is sufficiently depressed. The latch member 106 is also provided with a beveled surface 111 which is engageable by a block 112 to retract such member against the tension of spring 108 to release the rod 82. The rod 82 is thus permitted to rise under the pressure which the springs 80 of the needle assemblies supporting its associated bar 81 exert on such bar through the associated needle bars. At the time the pin 82 is depressed, the block 112 is withdrawn from the latch member 106, as shown in FIGS. 17 and 20, to enable the latter to latch with pin 82. On the completion of the stapling operation, rod 113 is actuated to swing the lower end of the block 112 into engagement with the bevel on latch member 106 to cause the release of pin 82.

The rod 113 is mounted for rotational movement on bearing brackets 114 in FIG. 1 supported by the end frame units 15. As is shown more clearly in FIG. 21, the rod 113 is rocked through an arm 115 which pivotally carries at its outer end a depending link 116 having pivotally connected to its lower end a wedge-shaped slide element 117 slidably mounted between two vertically disposed spaced guide rails 118. Wedgingly engageable with slide element 117 is an element 170 slidably mounted on the rails 118 below element 117. Slide element 170 is connected by a link 171 to one end of a lever 119 mounted for pivotal movement about a fixed pin 120. The pin 120 is formed at the lower end of a vertically disposed bracket 121 depending from plate 45. The other end of lever 119 is connected to the lower end of a vertically disposed link 122 pivotally connected at its upper ed to an arm 123 for supporting the longitudinally disposed plate 124 on which are mounted the stapling guns 125. The arms 123 supporting the plate 124 are pivotally connected to the braket frame unit to oscillate about an axis 126 in FIG. 2. Pivotal movement is imparted to the swingable unit composed of arms 123 and plate 124 by a pair of air cylinders 127 which as is shown in FIGS. 1 and 2 are mounted upon the ends of plate 45 and have their rods 128 connected to the ends of plate 124 adjacently to the front edge thereof. The air cylinders 127 are connected by pipes 129 in FIG. 8 to a valve 131 which controls the air supply from a supply source 132. The valve 131 is in turn controlled by the eccentric 97 mounted on the driven shaft of reducer 98 to cause the air cylinders 127 to operate to lower stapler plate 124 when the fabrication of the ribbon bows on the needles 11 have been completed and to raise stapler plate 124 when the legs of the loops in the bows have been stapled together.

It will be understood from the foregoing description of the rod 113 and its associated parts, that when the stapler plate 124 is lowered from the position shown in FIG. 21 to staple the loops of each bow together, the plate first engages the tops of the pins 82 which are above the upper ends of the needles 11 and depresses such pins to depress the bars 81 which support the latter. Simultaneously the bars 81 draw the needle bars 79 downwardly to withdraw the needles 11 from before the advancing plate 124. The arrangement of the parts is such that as the needles 11 are being withdrawn from the intersecting portions of the ribbon impaled thereon, the plate 124 will come into engagement with the bows which are resting on the upper ends of the needle housings 75, thus maintaining the fabricated bows undisturbed in proper assembled condition on the needle assemblies. The shoulders 11' of the needles offer no substantial resistance to the withdrawal of the needles through the ribbon material because as has been previously pointed out, such shoulders are relatively small. When the stapler plate 124 thus comes into bow holding position relative to the needle housings 75, the latch members 106 will have moved into latching engagement with the shoulders formed by notch 105 on the pins 82 to lock the pins and consequently the needles 11 in their depressed or retracted positions.

In the downward movement of the stapler plate 124, the arm 123 associated therewith will move the link 122 downwardly to cause the lever 119 to pivot about pin 120 in a clockwise direction, as viewed in FIG. 21. During such movement of lever 119, the guide member 170 will rise on the rails 118 and come into jammed relation with the guide member 117 at the upper end of such rails. The two guide members will retain this interlocked relationship until the stapling operation is completed, whereupon the air cylinders 127 will raise the stapler plate 124 to its normal retracted position.

As the stapler plate 124 returns to its normal raised position, lever 119 will be pivoted about the axis of pin 120 in a counterclockwise direction, as viewed in FIG. 21, to cause the guide member 170 connected thereto, through element link 171, to move downwardly on the rails 118. As the guide member 170 is pulled down by lever 119, it pulls down the slide member 117 interlocked therewith and thereby pivots arm 115 downwardly to rock the rod 113 in a counterclockwise direction to cause the blocks 112 thereon to engage latch members 106 and thereby release the pins 82 in the manner previously described. With the release of pins 82, the latter and the supporting bars 81, needle bars 79 and needles 11 will be raised by the springs 80 to their normal positions, in position for the fabrication of the next set of bows to be formed on the needle assemblies. The slide elements 117 and 170 will retain their interlocked relation until pin 172 comes into engagement with a stop block 173 mounted on plate 45, whereupon the downward movement of element 117 will be terminated. As slide element 170 continues its downward movement by lever 119 the two elements will automatically become separated.

The rod 113 is provided with a plurality of bow flippers 130, each associated with a needle housing 75 in the manner shown in FIGS. 17 and 21. Thus when rod 113 is rocked by lever 119, pivoted member 116 and arm 115 in the manner aforesaid, each flipper 130 will move sharply upwardly about the pivotal axis of rod 113 and knock the completed bow upwardly and outwardly from its associated needle assembly. By this time the stapler plate 124 will have been raised sufficiently to enable the removed bow to be flipped out of the front of the machine and into a discharge receptacle. On the return of pivoted member 116 to its normal position, the flipper 130 will also return to the position shown in the drawings to enable it to flip the next bow fabricated on the needle assembly.

The stapling guns 125 are each an air gun type of known construction and includes a head 135 which is actuated to drive a staple in a known manner when the trigger 136 of the gun is operated by a member 137 after the plate 124 has come into bow holding position relative to the needle assembly housings 75. Associated with each stapler head 135 is a hopper 138 containing a supply of the discs 4 to be attached to the bows. The discs are successively fed into an opening 139 formed in the plate 124 beneath the stapler head 135 by a slide 140 carried on the front edge portion of plate 124. The slide 140 has an inner end portion 141 in FIG. 24 which is normally located at the bottom of the hopper 138 with the stack of discs 4 resting thereon. At the outer end of slide porion 141 the thickness of the slide is increased to provide a shoulder 142 having a height slightly less than the thickness of a disc 4 and engageable with the edge of the bottom disc in the stack in the withdrawn position of the slide. Thus, when the slide 140 is advanced, the shoulder 142 thereof will engage and will advance the bottom disc 4 in the stack into the opening 139 where it will be supported by the slide portion 141. The wall of opening 139 is provided with a groove 143 into which the slide pushes the disc being fed so that the latter will also be supported by such groove. As a result of this construction, the disc to be stapled to a bow is held firmly by the slide and the groove 143 until it is stapled to the bow. The slide is advanced and retracted by an arm 144 which is pivotally connected at its lower end thereto and which at its upper end is secured to a rod 145 extending longitudinally of and supported by plate 45 (note FIG. 1). Connected to the rod 145 is a handle 146 which may be pulled forwardly manually to rock rod 145 to advance slide 140 and which is pushed back to retract the slide 140.

It will be understood from the foregoing, that prior to the lowering of the stapler plate 124, the handle 146 is pulled to load the openings 139 with the discs 4 to be attached to the bows fabricated on the needle assemblies. The discs are firmly held in place in the openings by the coaction of the inner slide portions 141 and shoulders 142 and the grooves 143. After the plate 124 has been moved to proper position relative to the needle assemblies, with the discs 4 supported in the openings thereof deposited upon the bows, the stapler guns 125 are operated to drive staples 2 through the discs 4 and the intersecting leg portions of the loops in each bow. It will be noted in FIG. 19 of the drawings that the upper end of the housing 75 in each needle assembly is provided with a cup-shaped recess 147 which bends the ends 2a of a staple toward each other as the staple is being driven through the disc and ribbon, whereby the latter are locked together in their assembled relation. After the staple has been secured to the disc and ribbon loops of the bow, the handle 146 is operated by suitable linkage to withdraw the slide 140 and thereby release the disc before the stapler plate 142 is raised in the manner previously indicated. As is shown in FIG. 21 the linkage for operating handle 146 may include a bar 175 connected at its forward end to such handle and connected at its rear end to a lever 176 pivotally connected at 177 to the frame of the machine and maintained by a spring 178 in engagement with a suitable cam 179 provided on shaft 30. Reciprocable movement of the bar 175 may be controlled by a pin 180 provided thereon and slidable in a slot provided in a guide block 181.

As the stapler plate 124 is moved downwardly into operative position relative to the needle assemblies, ribbon severing means come into operation to separate the ribbon material forming the loops of the bows fabricated on such assemblies from the supply ribbon strips 10 extending through the guide plates 57. Any suitable severing means may be provided for this purpose. Thus, known types of mechanisms which operate by a shearing action may be employed, or the type of electrical resistance means shown in FIGS. 1 and 21 of the drawings may be used. As illustrated, the electrical severing means may be composed of a plurality of conductor blocks 148 secured in aligned, longitudinally extending, spaced realtion to the underface of plate 124 adjacently in rear of the plate openings 139. The blocks 148 are located between the openings 139 and are connected by pieces 149 of resistance wire which span the spaces between the blocks. Suitable electrical connections are provided to supply an adequate electric current through the blocks 148 and resistance wires 149 to bring the latter to a temperature at which they will readily burn through the ribbon material. It will thus be understood that when the plate 124 is lowered, a resistance wire 149 will come into contact with the portion of ribbon extending between the needles 11 and ribbon guide plate 57 of the associated bow making device and by a burning operation sever the bow from the supply strip of ribbon.

It is believed that an adequate understanding of the operation of the machine disclosed herein will be obtained from the above description thereof. However, it is believed advisable to summarize generally the manner in which the machine functions in each cycle thereof. The following summary of operations will be given with relation to one of the bow making devices, but it will be understood that such summary will apply also to all of the bow making devices of the machine which are simultaneously operating in the same manner.

Ribbon from the supply roll 22 is continuously fed into a supply loop between the feeding rolls 23, 24 and the ribbon guide plate 57. In its reciprocating movements, the plate 57 will intermittently withdraw from the supply loop, the successive lengths of ribbon used in constructing the bows being fabricated. The plate 57 is of a length approximately equal to the length of ribbon that is used in forming a bow loop and its forward end is spaced from the needles 11 a distance approximating such length. Consequently, in each advancing movement of the plate 57, it will advance the rear end of the length of ribbon which is located between it and the needles, fold such length of ribbon into a bow and attach such rear ribbon end to the needles 11. Simultaneously the plate 57 will be withdrawing from the loop the length of ribbon that will be used in forming a similar loop of the bow in the second successive cycle of operations of the machine. The length of ribbon for the next cycle of the machine will be merely carried forwardly on the guide plate until the latter retracts, whereupon such length will become located between the plate and the needles, in position for the next cycle. In its advancing movement, the plate 57 will advance the gripped rear end of a length of ribbon along a path which will bring it over the needles 11. At the end of such advancing movement, the guide plate will move such gripped ribbon portion sharply downwardly and impale it on the needles 11 before withdrawing. The needles are each provided with a plurality of small barbs providing transverse shoulders which prevent the folded ribbon springing upwardly on the needles upon the withdrawal of the guide plate and becoming disengaged from the needles.

The ribbon is impaled on a plurality of needles instead of one, to fix each attached portion thereof relative to the needle bar and thereby enable the latter to rotate the bow loops fabricated thereon without disturbing their assembled relation to prepare the length of ribbon between such needles and the retracted forward end of the guide bar for the next loop forming operation. This rotation of the needle bar is always in the same direction so that the loops will be assembled in symmetrical radial disposition with the legs thereof in face-to-back relation. The amount of rotation of the needle bar necessary to accomplish this result, includes a 180 degree rotation of the needle bar to twist the said length of ribbon lengthwise to enable the ends of the loop to be brought together in flat, overlapping, face-to-back relation with the remainder of the loop smoothly arcuate and uncreased. The amount of rotation further includes an added degree of rotation of lesser extent so that the portion of ribbon to be attached will be at the proper angle of intersection with the previously attached portions to obtain the bow structure predetermined upon. Thus in each cycle of the machine the needle bar and consequently the needles thereon will rotate 180° plus the angle of intersection of the loop legs. For example, if there are to be five loops to be distributed within 360 degrees in the desired bow, the legs of each loop thereof will be at an angle of 36 degrees relative to each other. Accordingly in the operation of the machine the needle bar will be rotated through 180 plus 36 degrees or 216 degrees in the formation of each such loop. It is believed it will be apparent from the foregoing description, that by varying the stroke of the guide plate 57 and the rotational movement of the needle bar, different types and variations of bow structures can be fabricated on the machine.

Following the formation of the loops in the bow, the needles 11 are withdrawn therefrom as a cardboard disc 4 is being deposited thereon. Thus at no time is control of the loop structure interrupted and the loops thereof will be maintained in the manner in which they have been assembled even though they are no longer being held together by the needles. This operation is accomplished by the stapler plate 124 depressing a pin 82 as it is advancing toward the needle assembly loaded with the disc 4 to be applied to the formed loops, to retract through the bar 81 supporting such pin, the associated needle bar 79 against the tension of the needle assembly springs 80. The pin 82 is latched in depressed position to hold the needles retracted during the attachment of the disc to the formed loops. When the disc 4 is deposited on the loops, the stapler gun is actuated to drive a staple through the disc 4 and the intersecting leg portions of the loops and lock such bow elements together in their assembled relation.

When the stapler gun is withdrawn, the completed bow is flipped off the housing 75 of the needle assembly by a flipper 130 and into an awaiting receptacle, and the pin 82 is unlatched to permit the needles 11 to rise into loop forming position under the tension of springs 80. By the time the stapler gun has been fully retracted, the various elements and parts of the machine have been returned to their proper positions for the start of the next cycle of the machine.

While I have herein described and illustrated in the drawings, a preferred embodiment of my invention, it will be apparent to those skilled in the art that various changes may be made therein without departing from the spirit of the invention, or the scope of the appended claims.

I claim:

1. A machine for making bows from a continuous length of ribbon comprising means for supporting a supply of ribbon, loop retaining means on which the loops of a bow are formed, feed means for feeding ribbon from said supporting means to said retaining means and operable to apply successively to said retaining means portions of ribbon spaced along the continuous length thereof to form on said retaining means a given number of loops constituting a bow, and means for attaching a bow supporting member to each set of said ribbon portions forming such given number of bow loops while such ribbon portions are mounted on said retaining means to form a complete bow, said member attaching means comprising bow supporting member carrying means, means for movably mounting said bow supporting member carrying means for movement from a retracted position to position a bow supporting member against a set of said ribbon portions mounted on said retaining means, means operable when such given number of bow loops have been formed to cause said carrying means to advance to position a bow supporting member against such set of ribbon portions on said retaining means and to hold such member as it and such ribbon portions are secured together on said retaining means, means for supporting a supply of bow supporting members, and means for feeding a succession of such bow supporting members from said supply means to said member carrying means.

2. A machine for making bows from a continuous length of ribbon comprising means for supporting a supply of ribbon, loop retaining means on which the loops of a bow are formed, feed means for feeding ribbon from said supporting means to said retaining means and operable to apply successively to said retaining means portions of ribbon spaced along the continuous length thereof to form on said retaining means a given number of loops constituting a bow, and means for attaching a bow supporting member to each set of said ribbon portions forming such given number of bow loops while such ribbon portions are mounted on said retaining means to form a complete bow, said member attaching means comprising bow supporting member carrying means movable from a retracted position to position a bow supporting member against a set of said ribbon portions mounted on said retaining means, means operable when such given number of bow loops have been formed to cause said carrying means to advance to position a bow supporting member against such set of ribbon portions on said retaining means and to hold such member as it and such ribbon portions are secured together on said retaining means, said operable means including reciprocatable support means, and said carrying means being mounted on said support means and brought into registration with said retaining means at the end of each advancing movement of said support means in position to hold a bow supporting member registered with such ribbon portions on said retaining means while being secured thereto.

3. A machine for making bows from a continuous length of ribbon comprising means for supporting a supply of ribbon, loop retaining means on which the loops of a bow are formed, feed means for feeding ribbon from said supporting means to said retaining means and operable to apply successively to said retaining means portions of ribbon spaced along the continuous length thereof to form on said retaining means a given number of loops constituting a bow, and means for attaching a bow supporting member to each set of said ribbon portions forming such given number of bow loops while such ribbon portions are mounted on said retaining means to form a complete bow, said member attaching means comprising bow supporting member carrying means, means for movably mounting said bow supporting member carrying means for movement from a retracted position to position a bow supporting member against a set of said ribbon portions mounted on said retaining means, means operable when such given number of bow loops have been formed to cause said carrying means to advance to position a bow supporting member against such set of ribbon portions on said retaining means and to hold such member as it and such ribbon portions are secured together on said retaining means, and means operable to release a bow supporting member held by such carrying means when such member has been secured to such ribbon portions.

4. A machine for making bows from a continuous length of ribbon comprising means for supporting a supply of ribbon, loop retaining means on which the loops of a bow are formed, feed means for feeding ribbon from said supporting means to said retaining means and operable to apply successively to said retaining means portions of ribbons spaced along the continuous length thereof to form on said retaining means a given number of loops constituting a bow, and means for attaching a bow supporting member to each set of said ribbon portions forming such given number of bow loops while such ribbon portions are mounted on said retaining means to form a complete bow, said member attaching means comprising bow supporting member carrying means movable from a retracted position to position a bow supporting member against a set of said ribbon portions mounted on said retaining means, means operable when such given number of bow loops have been formed to cause said carrying means to advance to position a bow supporting member against such set of ribbon portions on said retaining means and to hold such member as it and such ribbon portions are secured together on said retaining means, said operable means including reciprocatable support means, said carrying means being mounted on said support means, means mounted on said support means and operable to apply fastening means to such bow supporting member and ribbon portions to secure them together, and means for actuating said fastener applying means to effect such securement while such bow supporting member is held by said carrying means.

5. A machine such as defined in claim 4, in which said fastener applying means is mounted on said support means in superimposed relation to said carrying means, and including means for supporting a supply of bow supporting members for said carrying means mounted on said support means adjacently to said carrying and fastener applying means.

6. A machine as defined in claim 4, in which said carrying means comprises a movable member engageable with a bow supporting member held thereby, and means for actuating said movable member to release a bow supporting member held by said carrying means when such member has been secured to such ribbon portions.

7. A machine as defined in claim 4, including means for supporting a supply of bow supporting members for said carrying means mounted on said support means, and means for feeding a succession of such bow supporting members from said supply means to said member carrying means, said feeding means and said carrying means being constructed and arranged to coact for the holding and release of a bow supporting member held by said carrying means.

References Cited

UNITED STATES PATENTS

| 2,884,169 | 4/1959 | Sperry | 223—46 |
| 2,933,223 | 4/1960 | Kravig et al. | 223—46 |
| 2,982,452 | 5/1961 | Anderson | 223—46 |

JORDAN FRANKLIN, Primary Examiner

GEO. V. LARKIN, Assistant Examiner